US007364168B2

(12) United States Patent
Comarmond

(10) Patent No.: US 7,364,168 B2
(45) Date of Patent: Apr. 29, 2008

(54) DEVICE FOR ASSEMBLING THE CASING AND THE BODY OF A HYDRAULIC ROCK-BREAKER

(75) Inventor: Jean-Sylvain Comarmond, Vourles (FR)

(73) Assignee: Montabert, Saint Priest (FR)

( * ) Notice: Subject to any disclaimer, the term of this patent is extended or adjusted under 35 U.S.C. 154(b) by 101 days.

(21) Appl. No.: 10/581,749

(22) PCT Filed: Dec. 9, 2004

(86) PCT No.: PCT/FR2004/003174

§ 371 (c)(1),
(2), (4) Date: Jul. 3, 2006

(87) PCT Pub. No.: WO2005/058552

PCT Pub. Date: Jun. 30, 2005

(65) Prior Publication Data

US 2007/0107697 A1 May 17, 2007

(30) Foreign Application Priority Data

Dec. 15, 2003 (FR) .................................. 03 14667

(51) Int. Cl.
B23B 5/22 (2006.01)
B23B 31/107 (2006.01)

(52) U.S. Cl. ................................. 279/19.3; 408/239 R

(58) Field of Classification Search ............... 279/19.3, 279/19.4, 19.5, 30; 408/239 R
See application file for complete search history.

(56) References Cited

U.S. PATENT DOCUMENTS

| | | | | | |
|---|---|---|---|---|---|
| 1,124,627 | A * | 1/1915 | Leyner | ...................... | 279/19.3 |
| 1,822,115 | A * | 9/1931 | Shepherd | ................... | 279/19.3 |
| 2,128,935 | A * | 9/1938 | Gartin | ....................... | 279/19.3 |
| 5,199,833 | A * | 4/1993 | Fehrle et al. | ........... | 408/239 R |
| 5,388,842 | A * | 2/1995 | Piras et al. | ................ | 279/19.5 |
| 6,092,814 | A * | 7/2000 | Kageler | ..................... | 279/19.4 |
| 6,224,303 | B1 * | 5/2001 | Wheeler et al. | ........ | 408/239 R |
| 7,121,774 | B2 * | 10/2006 | Hirt et al. | .................. | 408/240 |
| 2004/0011542 | A1 | 1/2004 | Comarmond | | |

FOREIGN PATENT DOCUMENTS

| | | | |
|---|---|---|---|
| WO | WO 01/85398 | A1 | 11/2001 |
| WO | WO 02/062534 | A2 | 8/2002 |

* cited by examiner

*Primary Examiner*—Thomas Moulis
(74) *Attorney, Agent, or Firm*—Oliff & Berridge, PLC

(57) ABSTRACT

The inventive device includes a casing, inside of which the body is accommodated that has the hydraulic striking mechanism, inside of which a bush is mounted for guiding a tool. Said tool is held in a manner that enables it to rotate in the guiding bush and its horizontally displacement therein is limited by a cotter. The guiding bush includes at least one non-circular peripheral area that interacts with an area having a complementary shape that is made in the front of the casing in order to limit the rotation of the bush and thus of the body relative to the casing.

12 Claims, 2 Drawing Sheets

DEVICE FOR ASSEMBLING THE CASING AND THE BODY OF A HYDRAULIC ROCK-BREAKER

The subject of the present invention is a device for assembling the casing and the body of a hydraulic rock-breaker.

Demolition machines of the hydraulic rock-breaker type usually comprise a casing, inside which is housed a body comprising the hydraulic percussion mechanism. Inside the body is mounted a tool, such as a pick or a chisel, guided and held by a guide bush, itself mounted inside the body.

During the operation of a rock-breaker, a rotary torque is transmitted by the body of the machine to the casing, particularly during the use of a tool whose active end is oriented.

It is therefore necessary to limit the rotation of the body inside the casing.

In the case of small hydraulic rock-breakers, it is of value to produce parts, casing and body of generally cylindrical shape, for reasons of simplicity of production, such parts being able to be obtained by turning.

The body must therefore be immobilized in translation in the casing by top and bottom mechanical abutments, whether elastic or not, and its rotation must be limited by a cottering arrangement situated between these two parts.

This rotational stop is put under severe strain during operation, by the effect of the vibrations and the torque transmitted by the tool to the rock-breaker, sometimes causing premature wear.

This rotation of the body relative to the casing must also be limited in the case of a casing and/or a body of polygonal cross section, whether or not of the same shape, fitted with clearance into one another.

The object of the invention is to provide a device for assembling the casing and the body of a hydraulic rock-breaker in which the body and the casing can be prevented from rotating simply and with great reliability.

Accordingly, the device to which the invention relates, comprising a casing, inside which is housed a body comprising the hydraulic percussion mechanism, inside which is mounted a bush serving to guide a tool, the tool being held in rotation and limited in translation in the guide bush by a cotter, and the guide bush being held in rotation and in translation in the body by a cotter, is characterized in that the guide bush comprises at least one peripheral zone of noncircular shape interacting with a zone of matching shape made in the front portion of the casing, in order to limit the rotation of the bush and hence of the body relative to the casing.

Thus, in the device according to the invention, the rotation of the body relative to the casing is limited by means of the bush for guiding the tool, the bush being prevented from rotating on the casing by means of at least one peripheral zone of noncircular shape, while the body is prevented from rotating relative to the bush by known means consisting of a cotter.

According to one embodiment of this device, the front end of the bush comprises at least one facet designed to press against a facet made in the transverse portion of the casing.

Advantageously, the front end of the bush comprises a peripheral zone of polygonal cross section, and the transverse portion of the casing comprises an opening of polygonal cross section matching the external shape of the bush.

According to another embodiment of this device, the front end of the bush and the transverse portion of the casing comprise a set of matching longitudinal splines-grooves.

According to one possibility, the operations of mounting the tool into the bush and the bush into the body are carried out with the aid of a single cotter, oriented transversely to the axis of the rock-breaker, and passing through bores, recess and notch made respectively in the casing, in the body, in the bush and in the tool.

According to another possibility, the operations of mounting the tool into the bush and the bush into the body are carried out with the aid of two distinct cotters, oriented transversely to the axis of the rock-breaker, one of the cotters passing through bores and recesses made in the casing, in the body and in the bush and the other cotter passing through bores made in the casing and the body and a notch made in the tool.

In the latter case, the guide bush may be very short and be made only at the front end of the body and of the casing.

In any case, the invention will be well understood with the aid of the following description, with reference to the appended schematic drawing representing, as nonlimiting examples, several embodiments of this assembly device for a hydraulic rock-breaker.

Figure 1:
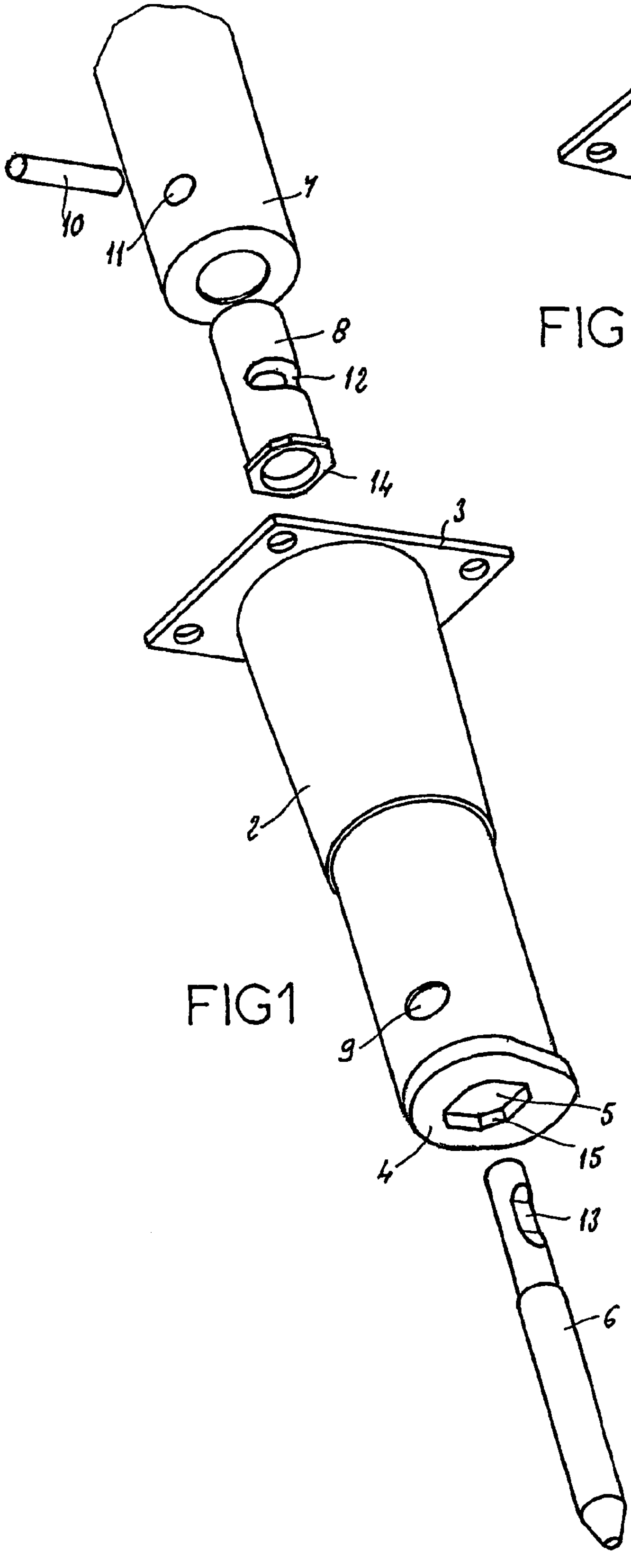
FIG. 1 is an exploded view in perspective of the main components of a first rock-breaker.
Figure 2:
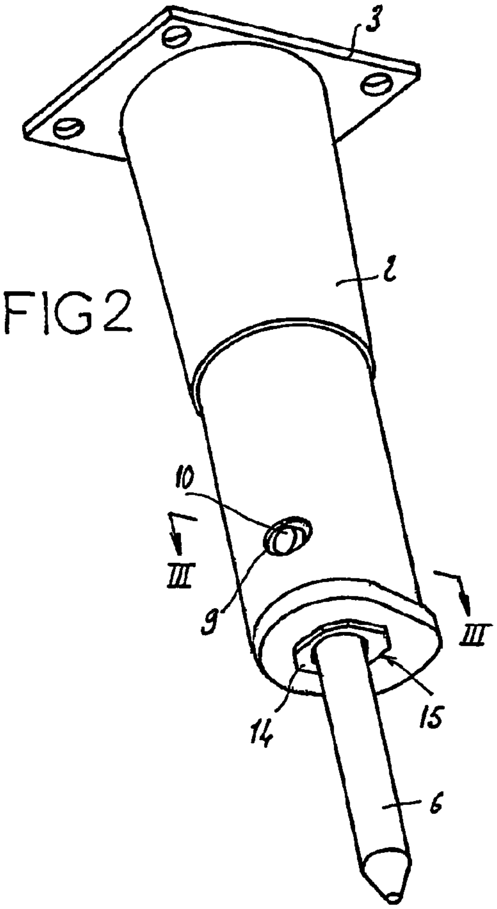
FIG. 2 is a view thereof in perspective, the various elements being assembled.
Figure 3:
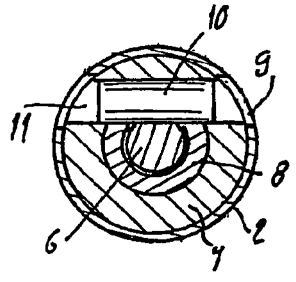
FIG. 3 is a view thereof in cross section along the line III-III of FIG. 2.

The rock-breaker shown in FIGS. 1 to 3 comprises a casing 2 of generally cylindrical shape, one end of which is fitted with a plate 3 for attachment to an industrial machine or similar element, and the other end of which is fitted with a transverse portion 4 comprising an opening 5 designed to allow a tool 6 to pass through. The inside of the casing 2 is designed to house a body 7 comprising the hydraulic percussion mechanism, inside which is mounted a guide bush 8 used to mount and guide the tool 6.

In practice, the casing 2 has a transverse bore 9 and the body 7 has a matching bore 11 allowing the engagement of a cotter 10. For its part, the guide bush 8 has, in its side wall, a through recess 12 allowing the passage of this same cotter 10, which protrudes into the volume delimited by the inner surface of the bush 8, as shown in FIG. 3, and enters into a notch 13 made in the rear portion of the tool 6. The cotter 10 is therefore used to retain the bush 8 relative to the body 7 likewise the tool 6 relative to the body 7 and to the bush 8.

According to the essential feature of the invention, the end of the bush 8 situated on the side of the transverse portion of the casing 2 has an outer faceted profile 14, and more precisely in the embodiment shown in the drawing, a polygonal profile consisting of a square shape with cropped corners. For its part, the transverse portion 4 of the casing 2 has an opening 5 delimited by a profile matching the profile 14, so that the end piece 14 is perfectly immobilized in the profile 15.

Thus, the guide bush 8 is prevented from rotating relative to the casing 2, the body 7 also being limited in rotation relative to the casing 2 by means of the bush 8 and the cotter 10.

Figure 4:
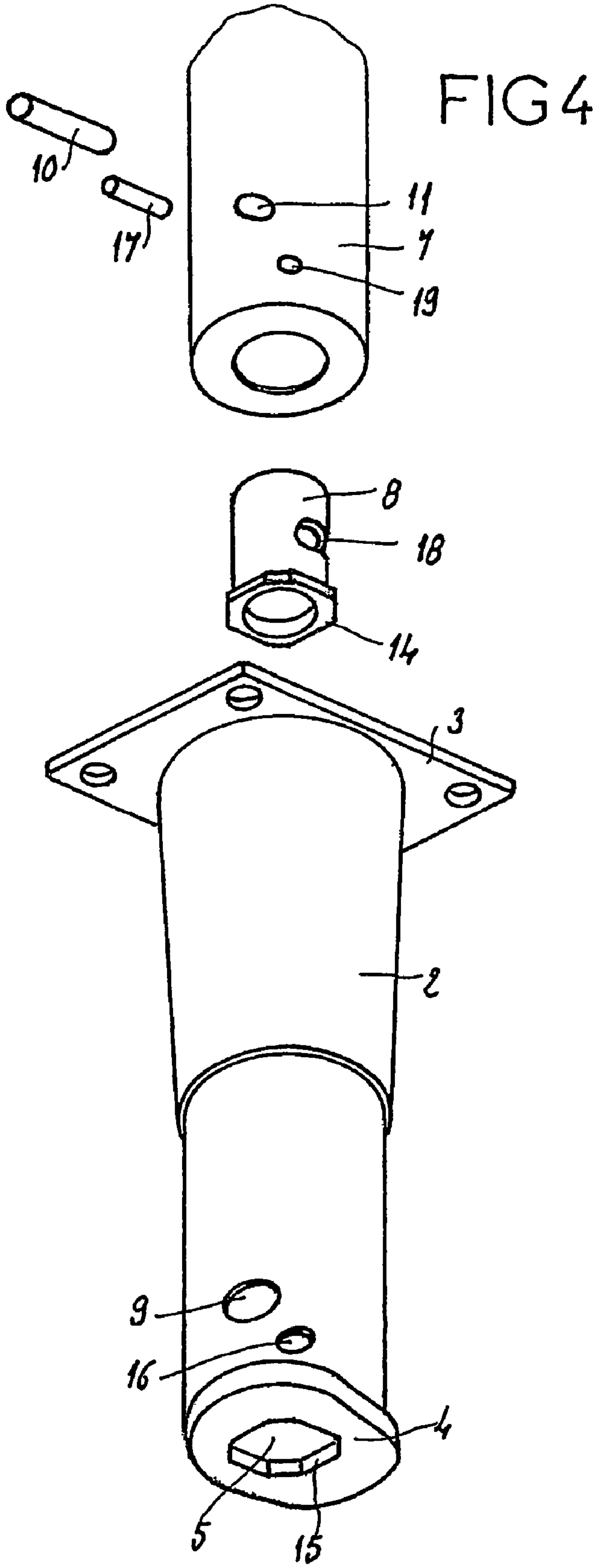
FIG. 4 is an exploded view in perspective of a second rock-breaker with no tool.

FIG. 4 shows another rock-breaker in which the same elements are indicated by the same reference numbers as heretofore.

In this case, the bush 8 for guiding the tool 6 is shorter then heretofore, so that the bush and the tool are fastened to the body separately. In the embodiment shown, the cotter 10 is engaged in the notch 13 and serves only to retain the tool 6. The casing 2 has another transverse bore 16, for the engagement of a cotter 17, designed to engage in a recess 18 of the guide bush 8 and to pass through a bore 19 of the body.

Figure 5:
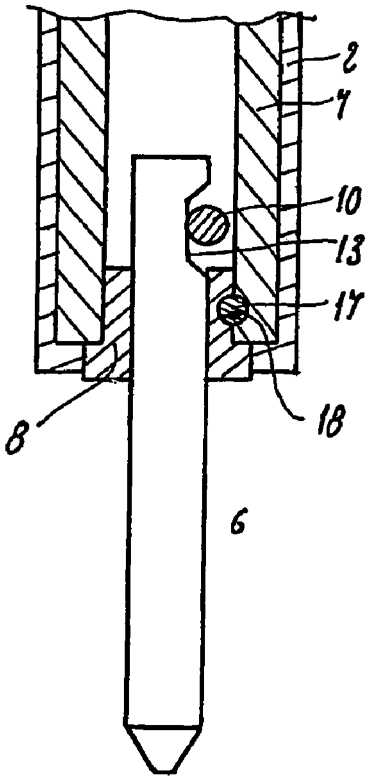
FIG. 5 is a view in longitudinal section of the bottom portion of the rock-breaker of FIG. 4, this section being made along the line V-V of FIG. 4.

In this case also, and as shown in FIG. 5, the casing 2 and the body 7 are prevented from rotating by means of the guide bush 8 by the faceted end 14 of this guide bush interacting with the transverse portion 4 of the casing 2, which has an opening 5 delimited by a profile 15 matching the faceted end 14.

As emerges from the foregoing, the invention provides a great enhancement to the prior art by providing a device that is for assembling the casing and the body of a rock-structure and that has a simple structure and an economic cost price.

It goes without saying that the invention is not limited solely to the embodiments of this device that are described hereinabove as examples; on the contrary it covers all the variant embodiments.

The invention claimed is:

1. A device for assembling the casing and the body of a hydraulic rock-breaker, comprising a casing, inside which is housed a body comprising the hydraulic percussion mechanism, inside which is mounted a bush serving to guide a tool, the tool being held in rotation and limited in translation in the guide bush by a cotter, and the guide bush being held in rotation and in translation in the body by a cotter, wherein the guide bush comprises at least one peripheral zone of noncircular shape interacting with a zone of matching shape made in the front portion of the casing, in order to limit the rotation of the bush and hence of the body relative to the casing.

2. The device as claimed in claim 1, wherein the front end of the bush comprises at least one facet designed to press against a facet made in the transverse portion of the casing.

3. The device as claimed in claim 2, wherein the front end of the bush comprises a peripheral zone of polygonal cross section, and the transverse portion of the casing comprises an opening of polygonal cross section matching the external shape of the bush.

4. The device as claimed in claim 1, wherein the front end of the bush and the transverse portion of the casing comprise a set of matching longitudinal splines-grooves.

5. The device as claimed in claim 1, wherein the operations of mounting the tool into the bush and the bush into the body are carried out with the aid of a single cotter, oriented transversely to the axis of the rock-breaker, and passing through bores, recess and notch made respectively in the casing, in the body, in the bush and in the tool.

6. The device as claimed in claim 1, wherein the operations of mounting the tool into the bush and the bush into the body are carried out with the aid of two distinct cotters, oriented transversely to the axis of the rock-breaker, one of the cotters passing through bores and recesses made in the casing, in the body and in the bush and the other cotter passing through bores made in the casing and the body and a notch made in the tool.

7. The device as claimed in claim 2, wherein the operations of mounting the tool into the bush and the bush into the body are carried out with the aid of a single cotter, oriented transversely to the axis of the rock-breaker, and passing through bores, recess and notch made respectively in the casing, in the body, in the bush and in the tool.

8. The device as claimed in claim 3, wherein the operations of mounting the tool into the bush and the bush into the body are carried out with the aid of a single cotter, oriented transversely to the axis of the rock-breaker, and passing through bores, recess and notch made respectively in the casing, in the body, in the bush and in the tool.

9. The device as claimed in claim 4, wherein the operations of mounting the tool into the bush and the bush into the body are carried out with the aid of a single cotter, oriented transversely to the axis of the rock-breaker, and passing through bores, recess and notch made respectively in the casing, in the body, in the bush and in the tool.

10. The device as claimed in claim 2, wherein the operations of mounting the tool into the bush and the bush into the body are carried out with the aid of two distinct cotters, oriented transversely to the axis of the rock-breaker, one of the cotters passing through bores and recesses made in the casing, in the body and in the bush and the other cotter passing through bores made in the casing and the body and a notch made in the tool.

11. The device as claimed in claim 3, wherein the operations of mounting the tool into the bush and the bush into the body are carried out with the aid of two distinct cotters, oriented transversely to the axis of the rock-breaker, one of the cotters passing through bores and recesses made in the casing, in the body and in the bush and the other cotter passing through bores made in the casing and the body and a notch made in the tool.

12. The device as claimed in claim 4, wherein the operations of mounting the tool into the bush and the bush into the body are carried out with the aid of two distinct cotters, oriented transversely to the axis of the rock-breaker, one of the cotters passing through bores and recesses made in the casing, in the body and in the bush and the other cotter passing through bores made in the casing and the body and a notch made in the tool.

* * * * *